United States Patent
Huck et al.

(10) Patent No.: US 7,602,090 B2
(45) Date of Patent: Oct. 13, 2009

(54) GEARING DRIVE UNIT COMPRISING AN ELECTRONICS INTERFACE

(75) Inventors: Thomas Huck, Rheinmuenster (DE); Klaus Oberle, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 391 days.

(21) Appl. No.: 10/551,120

(22) PCT Filed: Feb. 26, 2004

(86) PCT No.: PCT/DE2004/000356

§ 371 (c)(1),
(2), (4) Date: Sep. 23, 2005

(87) PCT Pub. No.: WO2004/095675

PCT Pub. Date: Nov. 4, 2004

(65) Prior Publication Data

US 2007/0018517 A1    Jan. 25, 2007

(30) Foreign Application Priority Data

Apr. 17, 2003    (DE) ................................ 103 18 062

(51) Int. Cl.
*H02K 11/00* (2006.01)
(52) U.S. Cl. .................. 310/71; 310/68 B; 310/75 R
(58) Field of Classification Search .............. 310/68 B, 310/71, 75 R
See application file for complete search history.

(56) References Cited

U.S. PATENT DOCUMENTS

| | | | | |
|---|---|---|---|---|
| 5,245,258 | A | * | 9/1993 | Becker et al. ............... 318/266 |
| 5,984,695 | A | * | 11/1999 | Riehl et al. ................ 439/76.1 |
| 6,191,512 | B1 | * | 2/2001 | Lekeux et al. ................ 310/89 |
| 6,317,332 | B1 | * | 11/2001 | Weber et al. ................ 361/760 |
| 6,459,183 | B1 | * | 10/2002 | Tasch et al. ................... 310/89 |
| 6,756,711 | B2 | * | 6/2004 | Matsuyama et al. ....... 310/68 R |
| 6,759,783 | B2 | * | 7/2004 | Hager et al. ................ 310/239 |
| 6,819,019 | B2 | * | 11/2004 | Tamura et al. ................ 310/71 |
| 6,873,076 | B2 | * | 3/2005 | Kaeufl et al. .................. 310/91 |
| 6,903,473 | B2 | * | 6/2005 | Matsuyama et al. ........... 310/71 |
| 6,927,514 | B2 | * | 8/2005 | Nesic .......................... 310/89 |

(Continued)

FOREIGN PATENT DOCUMENTS

DE    200 04 338    7/2001

(Continued)

*Primary Examiner*—Quyen Leung
*Assistant Examiner*—Naishadh N Desai
(74) *Attorney, Agent, or Firm*—Michael Best & Friedrich LLP (57) ABSTRACT

Gear drive unit (10)—combinable with various plug-in modules (34, 82, 94, 110)—with an electric drive motor (12) featuring an armature shaft (16) and at least one housing part (18) accommodating the armature shaft (16) and an electronic interface (36) to accommodate various plug-in modules (34, 82, 94, 110), which can be inserted into the electronic interface (36) in the insertion direction (55), wherein the electronic interface (36) features walls (38) that are spaced apart from each other, which walls form an opening (42) perpendicular to the armature shaft (16) and an opening (44) axial to the armature shaft, and at least one first sealing surface (50) and guides (64) are arranged on the walls (38) along the insertion direction (55) to seal various plug-in modules (34, 82, 94, 110) vis-à-vis the at least one housing part (14, 18).

19 Claims, 5 Drawing Sheets

U.S. PATENT DOCUMENTS

| | | | |
|---|---|---|---|
| 7,298,062 B2 * | 11/2007 | Kokubu et al. | 310/75 R |
| 2002/0079758 A1 * | 6/2002 | Matsuyama et al. | 310/68 R |
| 2003/0127921 A1 * | 7/2003 | Akutsu et al. | 310/68 R |
| 2004/0012279 A1 * | 1/2004 | Ursel et al. | 310/75 R |
| 2004/0061391 A1 * | 4/2004 | Matsuyama et al. | 310/71 |
| 2004/0178687 A1 * | 9/2004 | Mirescu | 310/75 R |
| 2005/0040715 A1 * | 2/2005 | Nesic | 310/71 |
| 2005/0184606 A1 * | 8/2005 | Kokubu et al. | 310/75 R |
| 2007/0103013 A1 * | 5/2007 | Sakohira et al. | 310/71 |

FOREIGN PATENT DOCUMENTS

| | | |
|---|---|---|
| DE | 101 41 244 | 3/2003 |
| EP | 0 538 495 | 4/1993 |
| JP | 2001-251808 | 9/2001 |
| JP | 2004166481 A * | 6/2004 |

* cited by examiner

GEARING DRIVE UNIT COMPRISING AN ELECTRONICS INTERFACE

BACKGROUND OF THE INVENTION

The invention relates to a gear drive unit with an electronic interface.

Various drive devices are already known in which a separate electric component can be coupled with a housing of the drive device. For example, DE 200 04 338 A1 shows a drive device with an electric motor in a gear housing into which a plug-in module can be inserted. The plug-in module has a fore part with a plug on the outside and a printed circuit board on the inside, on which the electronic components and motor contacts for the motor power supply are arranged. A SMD Hall sensor, which cooperates in an assembled state with the ring magnet of the armature shaft, is arranged on a finger of the printed circuit board.

The fore part of the plug-in module also has a guide provided with a seal, which correspondingly positions the plug-in module during insertion in a corresponding recess of the gear housing. The corresponding electronic interface of the corresponding gear housing features an approximately square opening for this plug-in module perpendicular to the armature shaft. In this case, the plug with the contact pins is arranged at an angle to the fore part of the plug-in module.

Disadvantageous with such a device is that the electronic interface of the gear housing is compatible only with a very specific shape of the guide and the seal on the fore part of the plug-in module. As a result, the installation volume of the plug-in module is greatly restricted by the design of the electronic interface, and the orientation of the electronic plug can only be varied in a limited way. Thus, orientation of the plug parallel to the armature shaft, for example, would call for a lot of installation space in the radial direction away from the armature shaft. Such an interface also does not permit a combination with a larger electronic housing, e.g., electronics for a door controller.

SUMMARY OF THE INVENTION

The gear drive unit has the advantage that with the embodiment of an electronic interface on the housing of a drive unit, which has an opening both radially as well as axially to the armature shaft, completely different plug-in modules of any shape and size can be combined with the drive unit. Due to the embodiment of at least one sealing surface and guides on the inside walls of the electronic interface, the various plug-in modules can be sealed with the correspondingly formed-on seals in a watertight manner. As a result, tool costs for manufacturing the housing of the drive unit can be reduced to a great degree since it can be combined with many different plug-in modules without substantial changes having to be made to the drive housing. For example, this type of electronic interface offers a solid and impervious connecting possibility with power window electronics, door controller electronics, sensor adapters or two-pin plugs.

Advantageous developments of the gear drive unit in accordance with the invention are possible. If the sealing surfaces on the electronic interface are embodied so that they radially seal the plug-in modules together with its seals, then the sealing effect is independent of the application force in the insertion direction. This is advantageous because more degrees of freedom are available for positioning the plug-in module exactly and the locking means for fastening the plug-in module are not stressed excessively.

Because of the embodiment of various sealing surfaces, which are arranged within the electronic interface radially offset from the armature shaft, the hollow space within the electronic interface can be used alternatively as an expanded installation space for the gear housing. This offers a high degree of variability for the different designs of the plug-in modules. In a preferred embodiment, the at least one housing part of the gear drive unit features a recess radial to the armature shaft, through which a printed circuit board of a plug-in module can be inserted. In this case, the printed circuit board can be arranged tangentially to the armature shaft, e.g., also for greater expansion in the axial direction, or else also lie in a plane perpendicular to the armature shaft. As a result, sensor elements can be positioned in the direct vicinity of the armature shaft or a transmitter element arranged thereon.

If a sealing surface is now formed by the walls of the recess in the housing part that are arranged radially to the insertion direction, then the gear drive unit can be combined with a plug-in module, which seals the drive unit at this recess with a seal in a watertight manner. Thus, the open installation space of the electronic interface can be used for the arrangement of an electronic plug, which, e.g., is oriented axially to the armature shaft. As a result, the installation space required for smaller plug-in modules can be kept low.

If a sealing surface is arranged approximately at the edge of the openings of the electronic interface, then the entire inside space of the electronic interface can be sealed via cooperation with a corresponding seal of another plug-in module and be used as a radially expanded gear housing installation space. As a result, the installation space required for larger plug-in modules, such as the electronics for power windows or electronics for a door controller, can be reduced.

It is especially advantageous if guides for a plug-in module are formed along the edge of the opening of the electronic interface in the insertion direction, and the guides are used to press the module's radial seal against the first sealing surface, which is formed by the inside wall of the electronic interface. This prevents the relatively flexible walls of the electronic interface from yielding laterally during insertion of the plug-in module and the interface from losing its imperviousness as a result. At the same time, the formed-on guides stabilize the walls of the electronic interface and also serve to mechanically hold the plug-in module, even those in which no seal is arranged.

If, radially towards the armature shaft, the side walls of the electronic interface run slightly conically, the plug-in module, particularly one with a formed-on seal, can be inserted more easily into the electronic interface since there is greater friction between the seal and the first sealing surface in the first part of the insertion path. In order to fasten the plug-in module, it is especially cost-effective to form locking means on the electronic interface, e.g., in the area of its openings, which cooperate with counter locking means on the plug-in module.

In another embodiment, a motor attachment plug instead of a plug-in module can be formed directly on the brush holder, which is arranged e.g., between the gear housing and the pole pot. In doing so, the same basic body of the gear housing as for the combination with a plug-in module can be used advantageously. In the case of this embodiment, just the recess in the gear housing for inserting the printed circuit board is sealed with the gear housing as a single piece, e.g., using a plastic injection molding process.

The first sealing surface of the electronic interface is therefore advantageously formed on in such a way that, when using a brush holder with a formed-on plug, the first sealing surface is guided around the exit location of the brush holder so that the first sealing surface is not harmed by replacing the brush holder.

The plug-in module, for use together with a gear drive unit in accordance with the invention has the advantage that the different seals of the various plug-in modules, each with a corresponding sealing surface of the electronic interface, reliably seal the entire housing imperviously. In doing so, the seal, made e.g., of a thermoplastic elastomer, is respectively arranged so that its sealing lip forms a radial seal together with the respective sealing surface. Because of the electronic interface in accordance with the invention, various plug-in modules with different shapes can be reliably connected with the drive unit in a simple manner. In this connection, it is especially favorable to arrange the electronic plug radially away from the armature shaft when using large plug-in modules, which extend e.g., over the entire length of the pole pot.

The installation space for smaller plug-in modules can be reduced by the electronic plug being oriented axially to the armature shaft in the direct vicinity of the pole pot.

If, for example, large electronics for a door controller are supposed to be connected with the drive unit in a watertight manner, the plug-in module features a jacket-like housing, which has a first seal on the one side for interacting with the sealing surface of the electronic interface and another seal on the other side for a cover of the plug-in module. In this way, a large electronic housing can also be arranged in a damp area since a reliable seal vis-à-vis the gear housing is guaranteed.

If the plug-in module has a printed circuit board, which can be inserted into the recess in the gear housing, exact positioning of the adjusting drive can be realized in a simple manner via the arrangement of a sensor system for detecting speed. In this case, exact positioning of the sensor system, e.g., two Hall sensors, is guaranteed by the side walls and the guide rails of the electronic interfaces.

In order to stabilize the plug-in module, a frame element can be arranged between the outside walls of the plug-in module in such a way that the plug pins of the plug and the printed circuit board can easily make contact via press-in technology. In this connection, the current contacts can be favorably arranged directly on the frame element, which is completely accommodated by the electronic interface in an inserted state. In this case, the printed circuit board can be simply mounted on the plug laterally without obstacles and guided into the plug-in module.

In order to electrically adjust the window panes in a motor vehicle, for example, the customer often desires that a first gear drive unit should be connected with a larger plug-in module, e.g., electronics for a door controller or power windows, and additional gear drive units should just be equipped with a two-pin motor contact plug. In addition, these types of gear drive units are also used to some extent in dry or even in moist areas. The system of a gear drive unit in accordance with the invention with an essentially unchanged housing and an unchanged electronic interface makes it possible to realize various requirements for the adjusting drives in a manner that is both cost effective and saves installation space by reducing the diversity of parts.

BRIEF DESCRIPTION OF THE DRAWINGS

Exemplary embodiments of the invention are depicted in the drawings and explained in greater detail in the following description.

DETAILED DESCRIPTION

Figure 1:
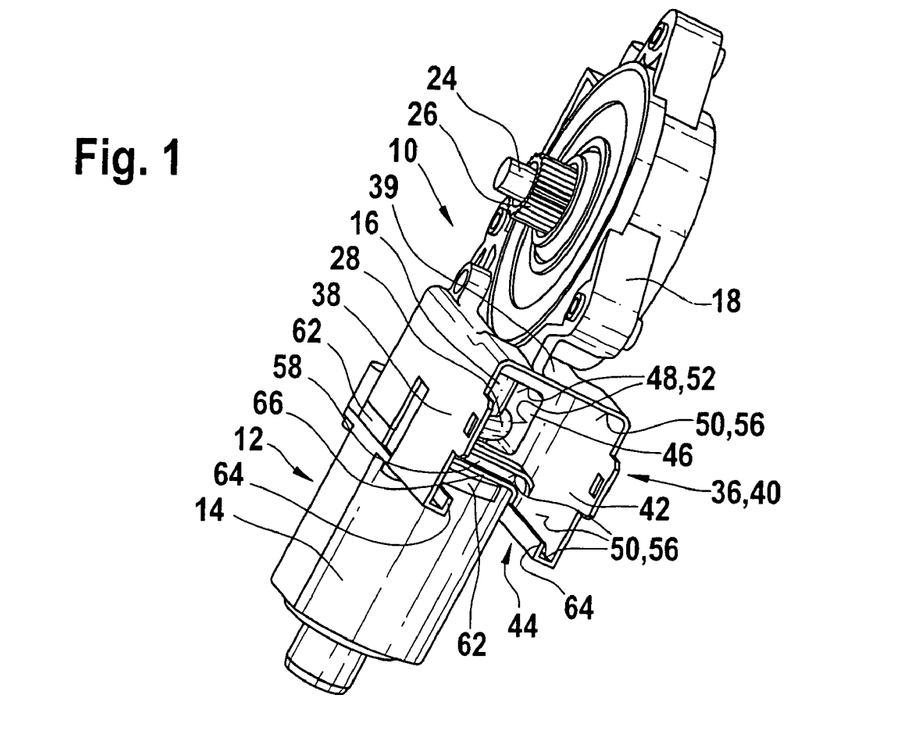
FIG. 1 shows A gear drive unit in accordance with the invention with an electronic interface, FIG. 2 Another drive unit with a plug formed on the brush holder, FIG. 3 A plug-in module in accordance with the invention, FIG. 4 The plug-in module according to FIG. 3 plugged into a drive unit according to FIG. 1, FIG. 5 Another plug-in module, FIG. 6 The plug-in module from FIG. 5 plugged into a drive unit according to FIG. 1, FIGS. 7 and 8 Another plug-in module comprised of a jacket-shaped housing and a cover accommodating a printed circuit board, FIG. 9 Another plug-in module in combination with a gear drive until according to FIG. 1.

FIG. 1 shows a gear drive unit 10, in particular for power windows, which has an electric motor 12, which is accommodated in a pole housing 14, from which an armature shaft 16 projects into a gear housing 18. A worm 20 is arranged on the armature shaft 16, which meshes with a driven gear 22 and transmits the force to the power window mechanism (not shown) via a driving pinion 26 positioned on its axis 24. In order to detect the position of an adjustment part, a ring magnet 28, which cooperates with Hall sensors 30 that are arranged on a printed circuit board 32 of a plug-in module 34, 82, 110, is arranged on the armature shaft 16 in the area of the gear housing 18. To insert a plug-in module 34, the gear drive unit 10 has an electronic interface 36, which is embodied by means of injection molding process to be a single part with a housing part 16, 18—in this case with the gear housing 18. The electronic interface 36 has walls 38 that are spaced apart, which extend away from the armature shaft 16. The two walls 38 practically form a housing 40 of the electronic interface 36 with an opening 42 radial to the armature shaft 16 and an opening 44 axial to the armature shaft 16, wherein the openings 42 and 44 are connected to one another and to a certain degree form a common opening with two opening directions (radial and axial). The two walls 38, which run approximately parallel to one another and to the armature shaft 16, are connected with one another by another wall 39, which runs approx. perpendicular to the walls 38 and to the armature shaft 16. The housing part 18 has a recess 46 towards the armature shaft 16, into which a printed circuit board 32 can be introduced either radially or tangentially to the armature shaft 16. If the recess 46 is embodied as an open break-through towards the motor compartment, it is necessary when inserting a plug-in module 34 for the entire motor and gear compartment to also be sealed in a watertight manner in order to also be able to use the drive in a moist area. For this purpose, at least two different sealing surfaces (a first one 50 and a second one 48) are embodied on the electronic interface 36, each of which can cooperate with different sealing arrangements 60, 88 of various plug-in modules 34, 82, 94, 110. The second sealing surface 48 is formed by the circumferential side wall 52 of the recess 46. As a result, the surface to be sealed corresponds with the cross-section of the recess 46 and lies completely in a plane at a fixed distance to the axis of the armature shaft 16.

Figure 5:
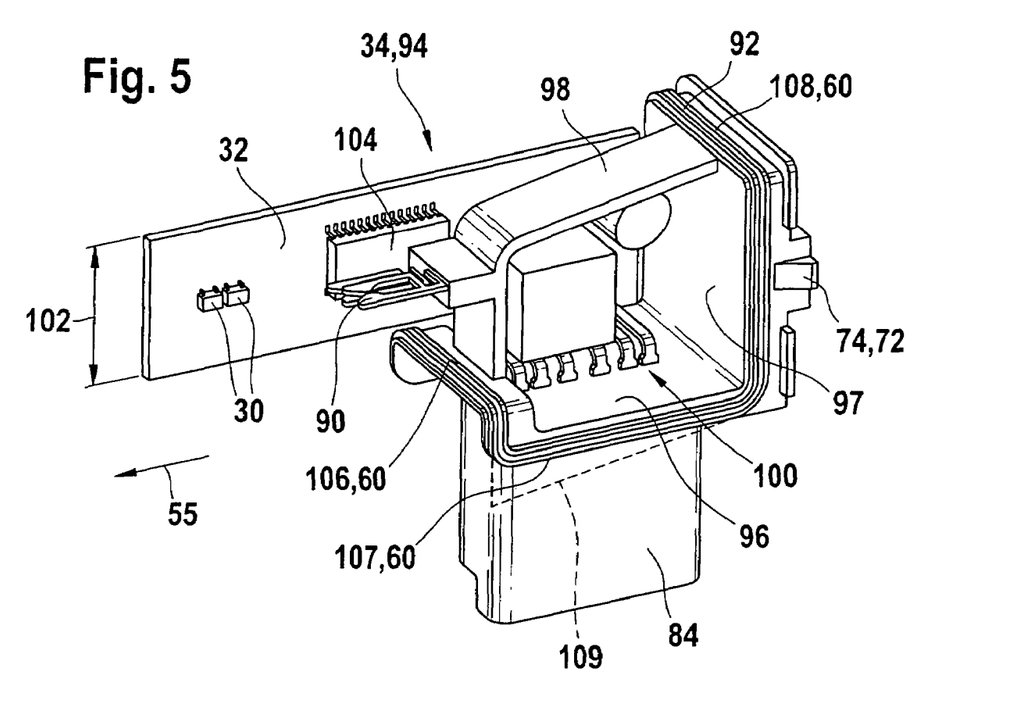

In order to combine with another plug-in module 34—e.g., in accordance with FIG. 5—the electronic interface 36 features a first sealing surface 50, which essentially extends along the edge of the openings 42 and 44. Since both the first sealing surface 50 and the second sealing surface 48 together with the corresponding seals 60, 88 of the respective plug-in modules 34 represent a radial seal with respect to the insertion direction 55, the first sealing surface 50 is formed by the inside surfaces 56 of the walls 38 and 39. The first sealing surface 50 is formed on the wall of the gear housing 18 by a projection 58 pointing radially away from the armature shaft 16. In the exemplary embodiment, this radial projection 58 is completely formed on the gear housing 18 since a corresponding seal 60 of the plug-in module 34, 94 is not supposed to cooperate with the pole pot 14 or with a brush holder 62 arranged between the pole pot 14 and the gear housing 18. The walls 38 and 39 have a certain flexibility since they are manufactured of plastic and are not supposed to be applied too thickly. If a plug-in module 34, 84 in accordance with FIG. 5 is inserted in the electronic interface 36, the walls 38 yield laterally. In order to prevent this, guides 64 are formed on the edge of the walls 38 in the insertion direction 55, which, on the one hand, stabilize the walls 38 and, on the other hand, press the seal 60 of the plug-in module 34, 84 radially with respect to the insertion direction 55 against the first sealing surface 50. The walls 38 in this case are approximately rectangular so that the inner volume of the housing 40 represents approximately a rectangular parallelepiped. In this connection, the guides are arranged essentially perpendicular to the armature shaft 16.

Even the radial projection 58 has a guide rail 66, which essentially runs parallel to the first sealing surface 50 formed by the radial projection 58. In order to mechanically fasten the plug-in module 34, eyes 70 are formed onto the walls 38 as locking means 68, into which counter locking means 74 of the plug-in module 34 embodied as locking hooks 72 hook once the plug-in module 34 is completely inserted. Because of the radial sealing direction of the two sealing surfaces 48, 50, the sealing effect is independent of the application force in the insertion direction 55 of the plug-in module 34 so that the locking means 68 in connection with the counter locking means 74 are used predominantly for mechanical fastening. In contrast to the to-be-sealed cross-section of the second sealing surface 48, the to-be-sealed cross-section of the first sealing surface 50 does not lie in a plane at a constant distance from the axis of the armature shaft 16, rather it also extends over the entire radial extension of the walls 38. Therefore, the two sealing surfaces 48 and 50 are arranged offset from one another in the insertion direction 55 so that respectively different sized installation space volumes within the electronic interface 36 are sealed vis-à-vis the environment by the two sealing surfaces 48 and 50.

Figure 2:
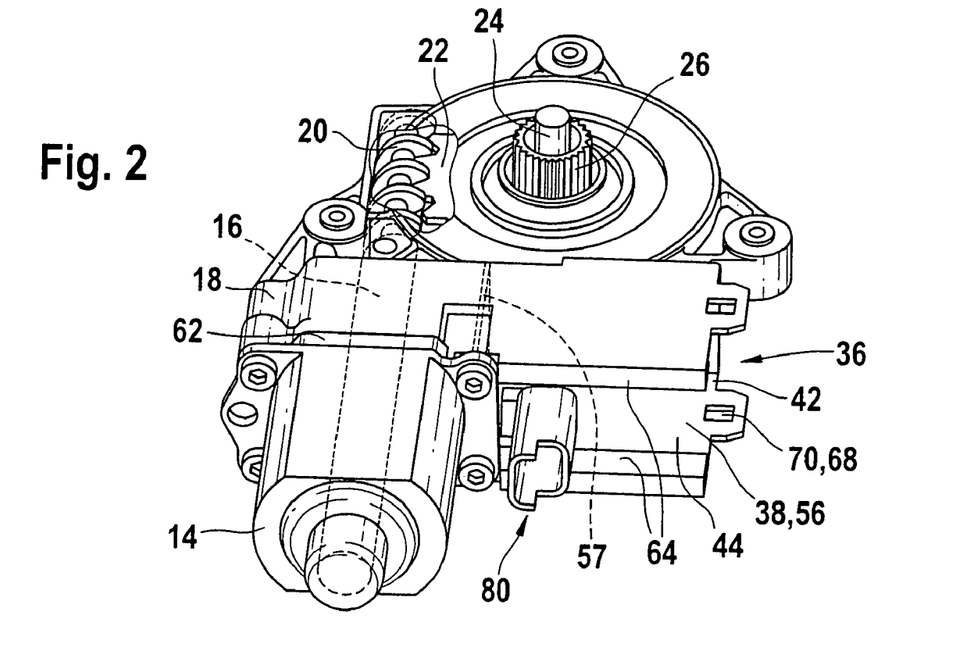

FIG. 2 shows an essentially structurally equivalent gear drive unit 10 with a electronic interface 36, wherein in the brush holder 62, which in this case is embodied to be annular around the armature shaft 16, features a motor contact plug 80 that is formed as a single piece. This type of motor contact plug 80 has two contact pins for example, which make direct power supply of the brushes possible. The brush holder 62 in this case is arranged between the gear housing 18 and the pole housing 14 in such a way that the housing 14, 18 is sealed in a watertight manner at this location. Therefore, in the case of this design, the recess 46 from FIG. 1 is embodied to be closed, i.e., there is no open break-through towards the armature shaft 16 to insert a printed circuit board 32. To do this, the tool to manufacture the gear housing 18 can be slightly modified by using a slider, which can be used during the injection molding process (plastic) to form a wall 57 sealing the motor compartment in the interior of the electronic interface 36. In this connection, the two side walls 38 are embodied to be slightly conical, whereby the slider can be removed more easily at the end of injection molding. The electronic interface 36 and in particular the first sealing surface 50 with the radial projection 58 is embodied in the process in such a way that it is possible to replace the brush holder 62 without a motor contact plug 80 with this type with a formed-on motor contact plug 80 in accordance with FIG. 2 without additional modification of the electronic interface 36 and the gear housing 18. This type of gear drive unit 10 is not combined with a plug-in module 34 since no additional electronics or sensory mechanism besides the motor contacts are provided. The motor contact plug 80 extends in this connection into the open installation space of the electronic interface 36 to some extent so that the motor contact plug 80 hardly requires any additional installation space.

Figure 3:
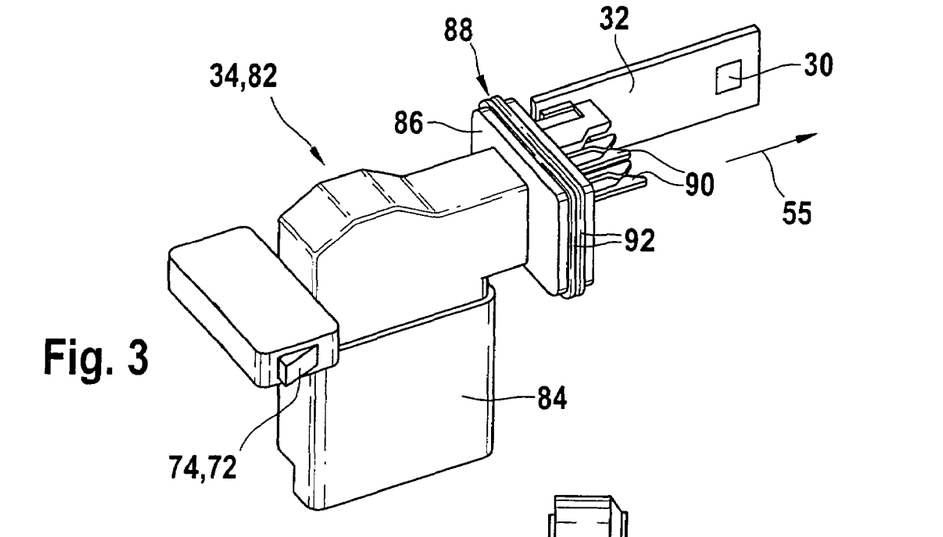

FIG. 3 shows a sensory mechanism plug-in 82 as a plug-in module 34, which essentially features an electronic plug 84 and a fore part 86 on which a printed circuit board 32 to accommodate electronic sensor components 30 is arranged. The fore part 86 features a circumferential seal 88 radial to the insertion direction 55, which is preferably manufactured of a thermoplastic elastomer. When inserting the sensory mechanism plug-in 82 into the gear drive unit 10 in accordance with FIG. 1, the printed circuit board 32 is introduced into the recess 46, wherein the bifurcated contacts 90 formed on the inside motor side of the fore part produce a power feed with the counter contacts arranged on the brush holder 62. These bifurcated contacts 90 replace the motor contact plug 80 in the case of the gear drive unit 10 in accordance with FIG. 2. During insertion the fore part 86 conforms to the recess 46, wherein the sealing lips 92 formed onto the seal 88 are pressed radially to the insertion direction 55 against the sealing surface 48, which is formed by the lateral wall 52 of the recess 46. In doing so, the counter locking means 74 (locking hooks 72) formed on the electronic plug 84 lock into the locking means 68 (eyes 70) of the electronic interface 36.

Figure 4:
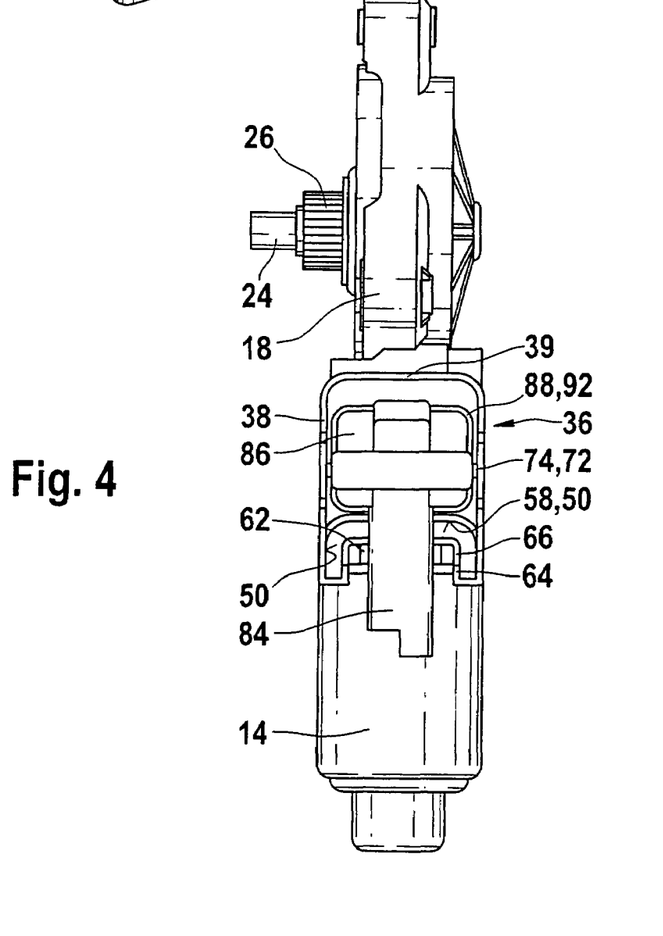

FIG. 4 depicts the sensory mechanism plug-in 82 in an inserted state in a gear drive unit 10 in accordance with FIG. 1. In this case, the fore part 86 forms a wall closing the gear housing 18, which seals the motor compartment. In this case, the electronic plug 84 extends to a large extent into the open installation space of the electronic interface 36. The exact positioning of the printed circuit board 32 and the electric bifurcated contacts 90 is produced in this case by the sealing surface 48, which simultaneously serves as a guide, in connection with the locking and counter locking means 68, 74. The electronic plug 84 extends in this case axially to the armature shaft 16 in the direct vicinity to the pole pot 14 so that hardly any additional installation space is required as compared with the housing 40 of the electronic interface 36. With a view in the insertion direction 55, FIG. 4 also shows the first sealing surface 50 (that is not used with the sensory mechanism plug-in 82) with a radial projection 58 and the associated guide rail 66. With this arrangement, it is easy to see that the shaping of the two sealing surfaces 48, 50 and the guide rail 66 and the guides 64 do not interfere with replacing the brush holder 62 with a motor contact plug 80 that is arranged thereon.

FIG. 5 shows the electronics for power windows 94 as another plug-in module 34 with a printed circuit board 32 to insert into the recess 46 in a gear drive unit 10 in accordance with FIG. 1. The printed circuit board 32 is inserted in this case tangentially to the armature shaft 16 so that speed sensors 30 are arranged directly adjacent to the magnet 28 on the armature shaft 16. The electronic module 94 features outside walls 96, 97 arranged at an angle to one another, which are also connected to each other via a L-shaped frame element 98. Extending on one of the outside walls 96 in the exterior area axial to the armature shaft is an electronic plug 84, which is connected to the printed circuit board 32 with plug pins 100, e.g., by means of press-in technology. The L-shaped arrangement of the frame element 98 makes possible free access for mounting the printed circuit board 32 as well as a reliable accommodation for the printed circuit board 32 in the electronic module 94. In this case, the printed circuit board 32 extends over an axial area 102, which essentially corresponds to the axial extension of the outside wall 97 perpendicular to the insertion direction 55. In this case, the axial extension of the recess 46 is adapted to the axial extension 102 of the printed circuit board 32 so that the printed circuit board can also be used for arranging larger electronic components 104. A radial seal 60 for sealing is arranged on the electronic module 94 in such a way that in an inserted state it cooperates with the first sealing surface 50. In this case, the guide rail 66 presses the sealing section 106 facing the armature shaft 16 against the radial projection 58. The sealing sections 107 along the insertion direction 55 are pressed via the guides 64 against the inside surface 56 of the walls 38. The sealing area 108, which is arranged circumferentially on the outside wall 97 perpendicular to the insertion direction 55, is also pressed on the sealing surface 50 on the inside wall 56 of walls 38 and 39. In this case, the individual sealing areas 106, 107, 108 lie in different planes, which are arranged at least partially at an angle to one other. Because of this progression of the seal, both adjacent openings 42 and 44 are sealed tightly and the entire installation space of the electronic interface 36 is gained as additional motor compartment space. Again formed on the outside wall 97 are counter locking means 74, which engage in locking means 68 of the electronic interface 36 and mechanically fasten the electronic module 94 together with the guides 64. Corresponding to the shaping of the first sealing surface 50 in the area of the radial projection 58, the sealing section 106 is formed in such a way even in the case of the electronic module 94 that the optional arrangement of a motor contact plug 80, which is embodied as a single piece with a brush holder 62, is not impeded.

Figure 6:
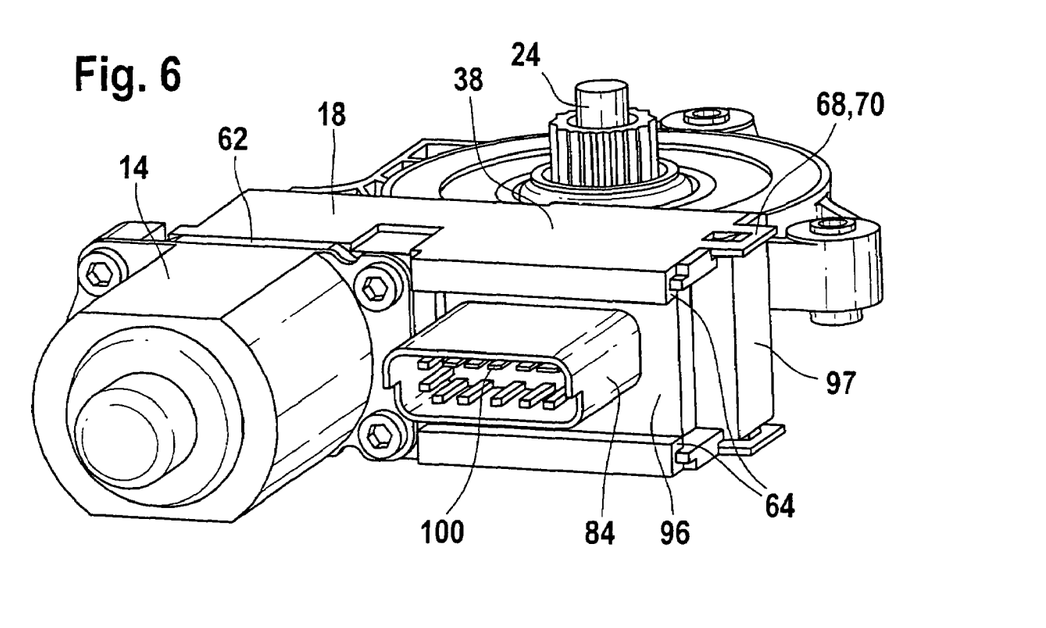

FIG. 6 depicts the plug-in module 94 from FIG. 5 inserted into a gear drive unit 10 in accordance with FIG. 1. In this case, the electronic plug 84 with the plug pins 100 extends axially to the armature shaft 16. The guides 64 accommodate the housing areas 96, 97 of the plug-in module 94 along the sealing sections 107 in this case.

In a variation of this exemplary embodiment, the sealing areas 107 do not run in the insertion direction 55, rather they are arranged inclined to it as depicted by the dashed lines (109) in FIG. 5. Correspondingly, the guides 64 of the gear drive unit 10 are adapted in terms of their orientation to the sealing sections 107, or eliminated completely. Because of such a diagonal arrangement (109) of the sealing sections 107, the electronic module 94 can be inserted more easily into the electronic interface 36 since friction between the sealing section 107 and the first sealing surface 50 does not occur until the final section of the insertion path.

Figure 7:
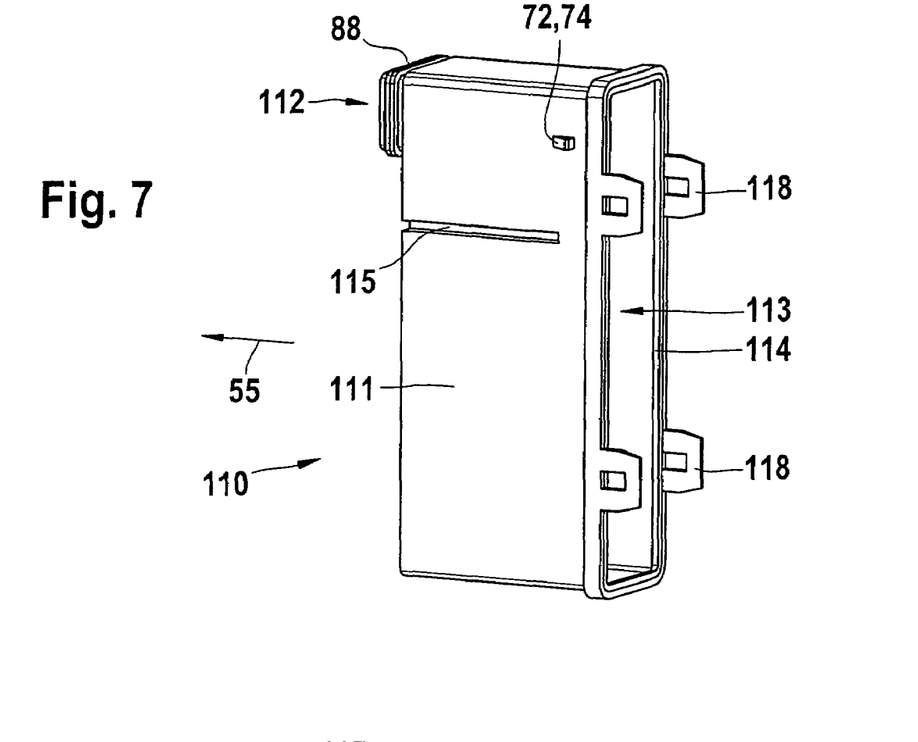
Figure 8:
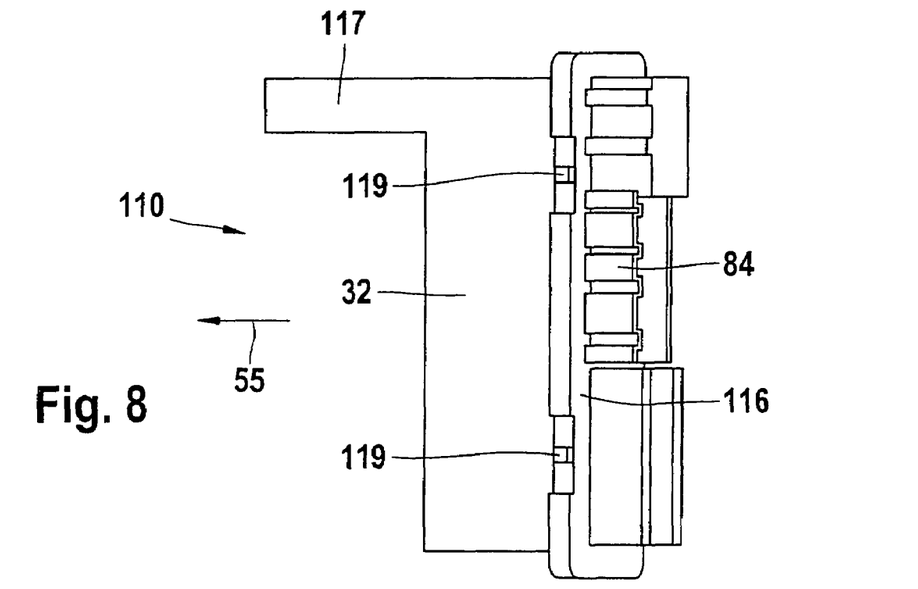

FIGS. 7 and 8 show electronics for a door controller 110 as another plug-in module 34, which features a jacket-like housing part 111. It has an opening 112 on the side facing the armature shaft 16 around which the seal 88 is radially arranged, which cooperates with the second sealing surface 48 of the electronic interface 36 in accordance with FIG. 1. On the side of the housing part 111 facing away from the armature shaft 16, it has another opening 113 over the entire axial extension with a radial seal 114 going around its inside. The jacket-like housing part 111 has grooves 115 on its side surfaces where the guides 64 engage during insertion into the electronic interface 36. In addition, counter locking means 74 are formed on, which engage in the locking means 68 of the electronic interface 36 and fasten the housing part 111 in a vibration-proof manner in connection with the grooves 115. As a further component, the door controller electronics 110 has a cover 116, which seals with the opening 113 in a water-tight manner. Arranged on the cover 116 is a printed circuit board 32 that has a finger 117, which, when closing the cover 116, projects through the opening 112 of the jacket-like housing part 111 into the recess 46 of the electronic interface 36. The cover 116 is in turn solidly fastened and sealed using connecting means 118 on the housing part 111 together with counter connecting elements 119 on the cover 116 (eyes and hooks). In this way, large volume door controller electronics can be combined with a structurally equivalent gear drive unit 10 by means of an identical electronic interface 36, like that of the power window electronics module 94 or the sensory mechanism plug-in 82, for example. In addition, by making a slight change in the gear housing 18 (closed wall 57), the design of the motor contact plug 80 formed on the brush holder 62 as a single piece can be realized.

Figure 9:
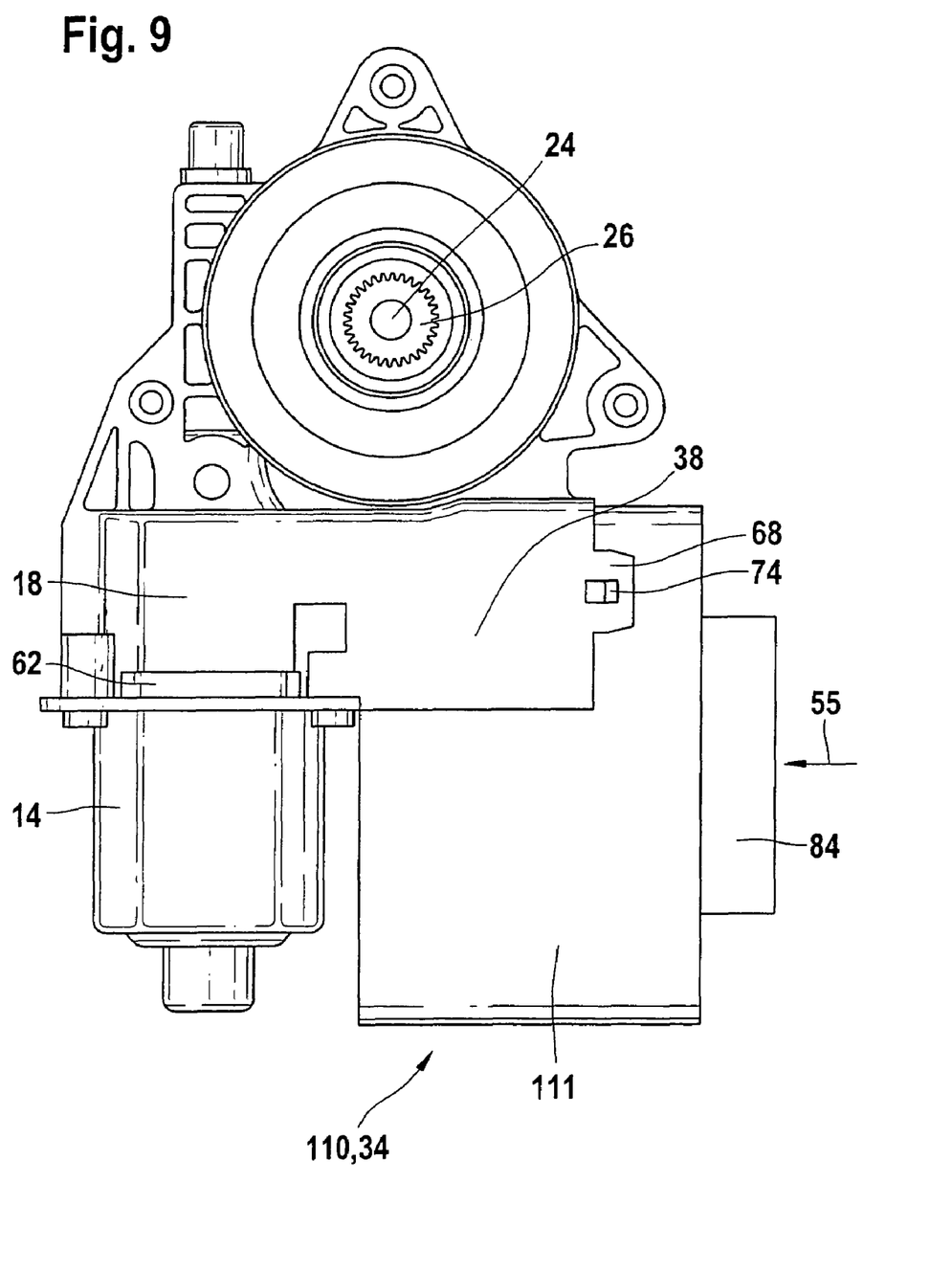

FIG. 9 shows electronics for a door controller 110 together with a gear drive unit 10 in an installed state. In this case, the electronic plug 84 is oriented radially like in FIG. 8 since the housing of the plug-in module 34 extends over the entire axial area of the pole pot 14. The plug-in module 34 in FIG. 9 for use in a dry area has no seals 60, 88. The correct positioning of the plug-in module 34 is accomplished via the guides 64 and the recess 46 in connection with the locking and counter locking means 68, 74. In this connection, the plug-in module 110 for a dry-area application is not embodied with a jacket-like housing part 111, rather as a half-shell concept, in which the two half shells 120 are joined and fastened perpendicular to the insertion direction 55.

The device in accordance with the invention is not limited to the described plug-in modules 34, 82, 94, 110, but includes any combination of different plug-in modules 34, 82, 94, 110 with variously formed-on seals 60, 88, 114 and variously formed printed circuit boards 32. The core of the invention consists of the fact that an identical electronic interface 36 makes it possible to combine an essentially structurally equivalent gear drive unit 10 with completely differently designed plug-in modules 34, 82, 94, 110. As a result, different volumes of installation space are made available for the electronics, wherein the orientation of the electronic plug 84 can vary in a simple manner (expansion of radial motor installation space). Of course, the counter locking means/locking means can also be glued on or replaced with other known connecting means such as screws or rivets.

The electronic interface 36 in accordance with the invention is suitable for applications in both moist areas as well as dry areas. Adjusting parts in a motor vehicle that are arranged to be moveable, e.g., wear parts on openings in motor vehicles, represents a preferred application. This type of system of a gear drive unit 10, which can be combined with different plug-in modules 34, 82, 94, 110, reduces the tool costs and makes flexible production that is adapted to the customer's wishes possible.

The invention claimed is:

1. A gear drive unit (10) comprising an electric drive motor (12), which has an armature shaft (16), and at least one housing part (14, 18), which accommodates the armature shaft (16), and an electronic interface (36) for accommodating different plug-in modules (34, 82, 94, 110) which can be inserted into the electronic interface (36) in the insertion direction (55), and the electronic interface (36) having walls (38) which are spaced apart from one another, with at least one first surface (50) and guides (64) being arranged on the walls (38) along the insertion direction (55) in order to seal off different plug-in modules (34, 82, 94, 110) from the at least one housing part (14, 18), characterized in that the walls (38) are approximately rectangular and form an opening (42) perpendicular to and an opening (44) axial to the armature shaft (16), and the openings 42 and 44 are connected to one another and form a common opening with radial and axial opening directions, the opening being substantially uninterrupted between the radial and axial opening directions, with the first surface (50) being formed by the inner surfaces (56) of the walls (38) in order to seal off the plug-in modules (34, 82, 94, 110) at least partially radially in relation to the insertion direction (55).

2. Gear drive unit (10) according to claim 1, characterized in that the electronic interface (36) features at least a second sealing surface (48) to seal various plug-in modules (34, 82, 94, 110), wherein the at least two sealing surfaces (48, 50) are arranged offset at least partially with respect to the insertion direction (55).

3. Gear drive unit (10) according to claim 1, characterized in that at least one housing part (18) features a recess (46) in the area of the electronic interface (36), into which a printed circuit board (32) of the plug-in module (34, 82, 94, 110) can be inserted tangentially or radially to the armature shaft (16).

4. Gear drive unit (10) according to claim 1, characterized in that the second sealing surface (48) is arranged essentially along the edge of the recess (46).

5. Gear drive unit (10) according to claim 1, characterized in that the first sealing surface (50) is arranged essentially along the edge of the openings (42, 44).

6. Gear drive unit (10) according to claim 1, characterized in that the guides (64) are arranged for pressing one of the seals (88, 60) that is arranged on the plug-in module (34, 94, 110) against the sealing surfaces (50) and/or for mechanically holding on the edge of the axial opening (44).

7. Gear drive unit (10) according to claim 1, characterized in that the walls (38) of the electronic interface (36) is arranged conically in the insertion direction (55).

8. Gear drive unit (10) according to claim 1, characterized in that locking means (68, 70) are arranged on the electronic interface (36) to lock with counter locking means (74, 72) on the plug-in module (34, 82, 94, 110).

9. Gear drive unit (10) according to claim 1, characterized in that the gear drive unit (10) features a brush holder (62), on which an optional, particularly two-pin, plug (80) is arranged for electric contacting, which projects from the at least one housing part (14, 18) in the area of the electronic interface (36), which housing part is designed to be sealed in the area of the electronic interface (36).

10. Gear drive unit (10) according to claim 1, characterized in that at the first sealing surface (50, 58) is arranged in such a way that it does not collide with the optional plug (80) that is formed on the brush holder and projects from the housing part (14, 18).

11. The gear drive unit (10) as claimed in claim 1, characterized in that the two walls (38) form a housing (40) of the electronic interface (36), which housing can be sealed off by a plug-in module, and the internal volume of the housing (40) approximately constitutes a cuboid which can be used as an additional motor compartment.

12. A plug-in module (34, 82, 94, 110) for insertion into an electronic interface (36) of a gear drive unit (10) comprising an electric drive motor (12), which has an armature shaft (16), and at least one housing part (14, 18), which accommodates the armature shaft (16), and an electronic interface (36) for accommodating different plug-in modules (34, 82, 94, 110) which can be introduced into the electronic interface (36) in the insertion direction (55), and the electronic interface (36) having walls (38) which are spaced apart from one another, with at least one first surface (50) and guides (64) being arranged on the walls (38) along the insertion direction (55) in order to seal off different plug-in modules (34, 82, 94, 110) from the at least one housing part (14, 18), wherein the walls (38) are approximately rectangular and form an opening (42) perpendicular to and an opening (44) axial to the armature shaft (16), and the openings 42 and 44 are connected to one another and form a common opening with radial and axial opening directions, including no structural hindrance between the radial and axial opening directions, with the first surface (50) being formed by the inner surfaces (56) of the walls (38) in order to seal off the plug-in modules (34, 82, 94, 110) at least partially radially in relation to the insertion direction (55), wherein the plug-in module (34, 82, 94, 110) has a printed circuit board (32), an electronic connector (84) and a radial seal (88, 60) which can interact with at least one surface (48, 50) of the gear drive unit (10) in such a way that at least one housing part (14, 18) of the gear drive unit (10) is closed off in a water-tight manner, and the plug-in module (34, 82, 94, 110) has two outer walls (96, 97) which are arranged at an angle to one another and can close off openings, which are connected to one another and have different opening directions (42, 44), in the electronic interface (36), and the two outer walls (96, 97) are additionally connected to one another by means of an L-shaped frame element (98) in such a way that both the printed circuit board (32) and also connections (100) of the electronic connector (84) are freely accessible in order to be mounted.

13. Plug-in module (34, 110) according to claim 12, characterized by an electronic plug (84), whose plugging direction runs essentially radial to the armature shaft (16).

14. Plug-in module (34, 82, 94) according to claim 12, characterized by an electronic plug (84), whose plugging direction runs essentially axial to the armature shaft (16).

15. Plug-in module (34, 110) according to claim 12, characterized by a jacket-like housing (111), which can cooperate with the one seal (88) with the second sealing surface (48) of the gear drive unit (10) and can be sealed with another seal (114) vis-à-vis a cover (116) of the plug-in module (34, 110) that features a plug (84).

16. Plug-in module (34, 82, 94, 110) according to claim 12, characterized by a printed circuit board (32), on whose side facing the armature shaft (16) at least parts of a speed detection device (30), in particular a Hall sensor system (30), are arranged.

17. The plug-in module (34, 82, 94, 110) as claimed in claim 12, characterized in that the printed circuit board (32) can be mounted laterally, perpendicular in relation to the insertion direction, on the electronic connector (84) in a simple manner without obstruction and with the connections (100) making contact with the printed circuit board (32) by means of press-fit technology.

18. The plug-in module (34, 82, 94, 110) as claimed in claim 12, characterized in that current contacts (90) are arranged directly on the L-shaped frame element, said current contacts establishing a power supply to mating contacts of a brush holder (62) of the gear drive unit.

19. A system for electrically adjusting movably arranged parts in a motor vehicle, in which system a gear drive unit (10) is combined with a plug-in module (34), the gear drive unit (10) comprising an electric drive motor (12), which has an armature shaft (16), and at least one housing part (14, 18), which accommodates the armature shaft (16), and an electronic interface (36) for accommodating different plug-in modules (34, 82, 94, 110) which can be introduced into the electronic interface (36) in the insertion direction (55), and the electronic interface (36) having walls (38) which are spaced apart from one another, with at least one first surface (50) and guides (64) being arranged on the walls (38) along the insertion direction (55) in order to seal off different plug-in modules (34, 82, 94, 110) from the at least one housing part (14, 18), characterized in that the walls (38) are approximately rectangular and form an opening (42) perpendicular to and an opening (44) axial to the armature shaft (16), and the openings 42 and 44 are connected to one another and form a common opening with radial and axial opening directions, the common opening extending substantially uninterrupted between the radial and axial opening directions, with the first surface (50) being formed by the inner surfaces (56) of the walls (38) in order to seal off the plug-in modules (34, 82, 94, 110) at least partially radially in relation to the insertion direction (55), wherein the plug-in module (34, 82, 94, 110) has a printed circuit board (32), an electronic connector (84) and a radial seal (88, 60) which can interact with at least one surface (48, 50) of the gear drive unit (10) in such a way that at least one housing part (14, 18) of the gear drive unit (10) is closed off in a water-tight manner, and the plug-in module (34, 82, 94, 110) has two outer walls (96, 97) which are arranged at an angle to one another and can close off openings, which are connected to one another and have different opening directions (42, 44), in the electronic interface (36), and the two outer walls (96, 97) are additionally connected to one another by means of an L-shaped frame element (98) in such a way that both the printed circuit board (32) and also connections (100) of the electronic connector (84) are freely accessible in order to be mounted.

\* \* \* \* \*

UNITED STATES PATENT AND TRADEMARK OFFICE
CERTIFICATE OF CORRECTION

PATENT NO. : 7,602,090 B2  Page 1 of 1
APPLICATION NO. : 10/551120
DATED : October 13, 2009
INVENTOR(S) : Huck et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 506 days.

Signed and Sealed this

Fifth Day of October, 2010

David J. Kappos
*Director of the United States Patent and Trademark Office*